May 8, 1934.  A. E. F. BILLSTEIN  1,958,079
METHOD AND APPARATUS FOR TESTING FOR INTERNAL FLAWS
Filed Aug. 28, 1930  2 Sheets-Sheet 1
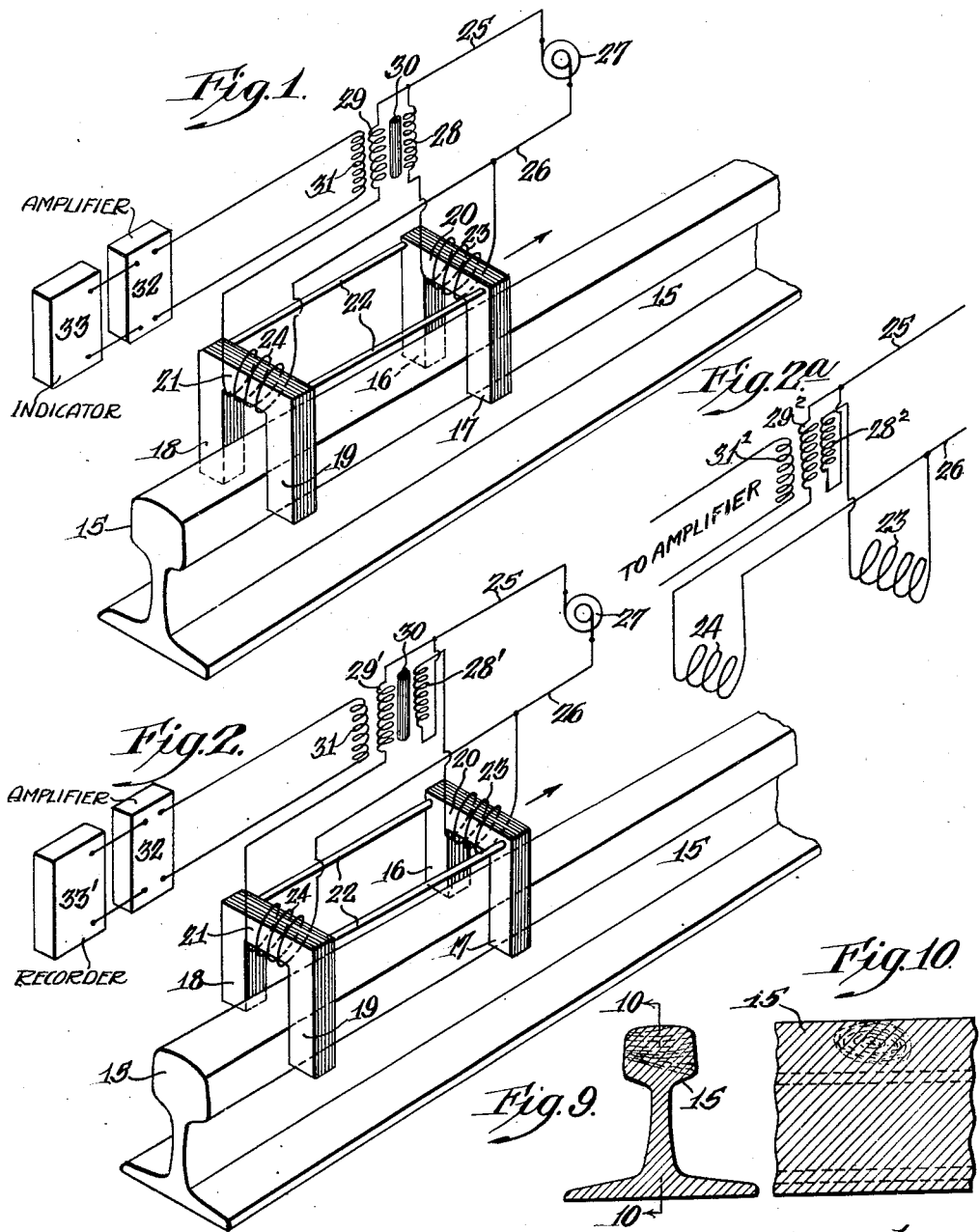
Inventor
Arthur E. F. Billstein.
by [signature]
Attorney
Witness:
[signature]

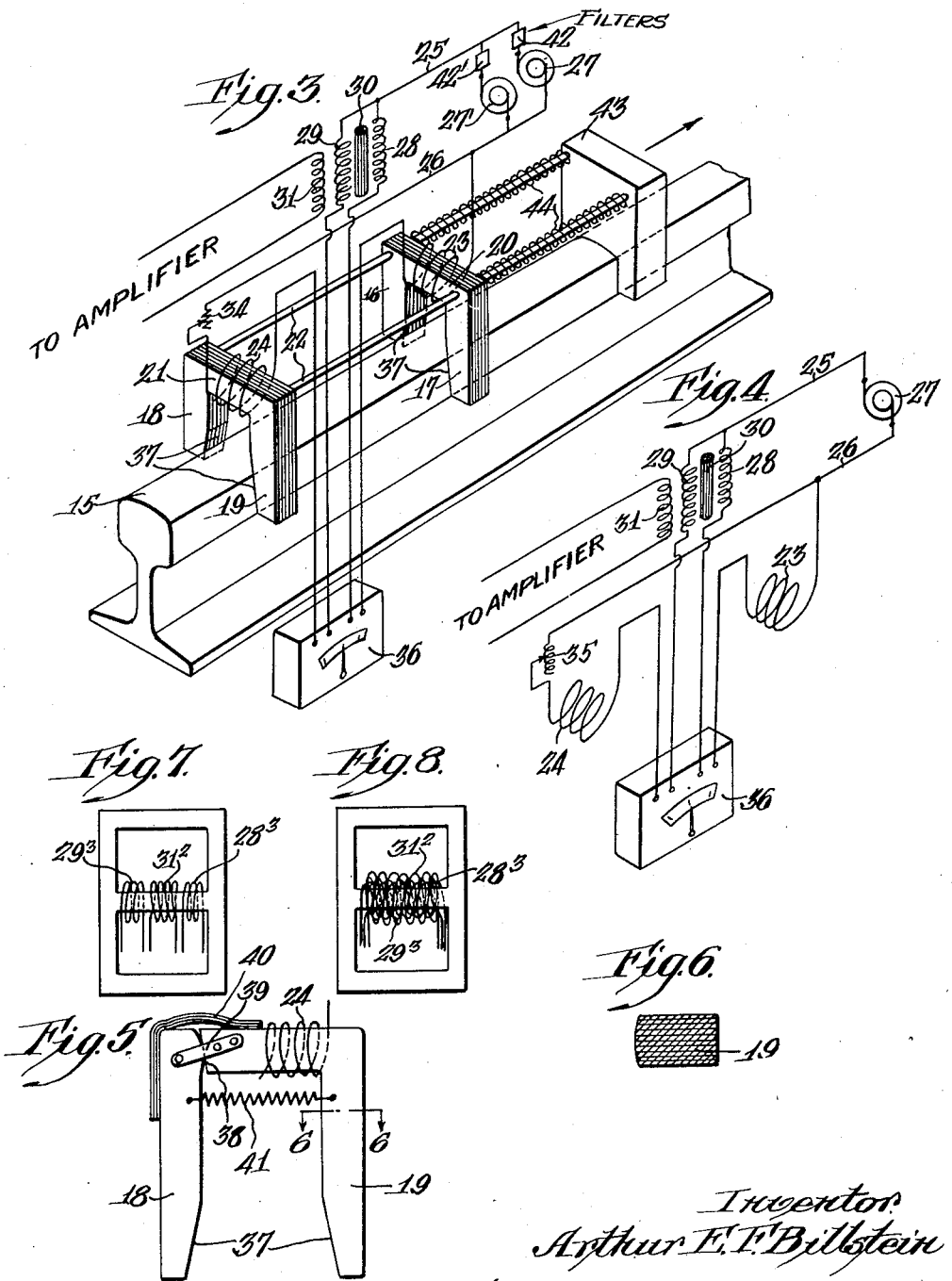

Patented May 8, 1934

1,958,079

UNITED STATES PATENT OFFICE 1,958,079

METHOD AND APPARATUS FOR TESTING FOR INTERNAL FLAWS

Arthur E. F. Billstein, Altoona, Pa., assignor to The Pennsylvania Railroad Company, Philadelphia, Pa., a corporation of Pennsylvania Application August 28, 1930, Serial No. 478,448

21 Claims. (Cl. 175—183)

My invention relates to methods and apparatus for finding imperfections in metallic objects and especially in railroad rails, castings, structural shapes, pipes, etc. For convenience I will refer to the object to be tested as a "rail".

One purpose of my invention is normally to balance the inductances of coils through which current passes to magnets concurrently moved along the rail and to magnify and indicate the differences between these currents due to differences in condition of the parts of the rail over which the magnets are passing.

A further purpose is to set up eddy currents at a plurality of points in planes parallel to the lengths of the rails and to indicate and interpret the differences in the eddy currents set up, which differences are produced by fractures or fissures in the structure of the rail.

A further purpose is to pass magnetic flux transversely through the head of a rail at two spaced points which progressively advance along the rail length, to balance the mutually inductive effects of the currents producing the fluxes and to indicate any variation in the comparative strengths of the mutually inductive effects.

A further purpose is to set up eddy currents of different ranges at each of two spaced points progressively advanced along the lengths of the rails and in planes parallel to their lengths and to indicate any comparative variation in the strengths of these currents.

A further purpose is to balance two branches of a testing circuit containing mutually effective inductance by adding resistance or reactance in one branch.

A further purpose is to accommodate a pair of detector magnets equally to different widths of rail heads with which they are adapted to engage.

A further purpose is to progress a guard in advance of the magnets to protect the magnets from contact with irregularities in the rail.

Further purposes will appear in the specification and in the claims.

My invention relates not only to the methods involved but to mechanism by which the methods may be carried out.

I have preferred to illustrate my invention by a few forms only among the many forms in which it may appear, selecting the forms primarily with a view to their value in illustrating the principles involved. The views are considered by me as diagrammatic even though structure is shown.

Figure 1 is a diagrammatic perspective view of one set of connections by which my invention may be carried out.

Figures 2, 3 and 4 are slightly variant diagrammatic forms showing circuits and mechanisms which may be used.

Figure 2a is a fragmentary diagrammatic view showing a modification of Figures 1 and 2.

Figure 5 is a diagrammatic side elevation showing one way in which variation in the width of the magnet legs may be secured.

Figure 6 is a section upon line 6—6 of Figure 5.

Figures 7 and 8 are diagrammatic views of windings of balanced and detector coils upon shell transformers.

Figures 9 and 10 are fragmentary sections of rails, transverse and longitudinal to the lengths of the rails.

In the drawings similar numerals indicate like parts.

As engineers recognize more and more that latent defects exist in rails and similar objects and that dangers threaten by reason of these defects, the importance of quick, easy and exact methods of testing the rails increases constantly. While the rails can be tested before they are placed in the track (though in my opinion most defects causing rail failures are produced during use), there are many thousands of miles of rails in place which require to be tested, and rails which have no discoverable defects when made develop these defects in use. It is therefore necessary to provide a method of testing which is capable of application to rails in use. My invention is intended to supply this need.

My invention is based upon the theory that parallel magnetic fluxes passed through the rails at spaced distances, and advancing along the lengths of the rails, will react differently where the portion of the rail adjacent to one flux contains a defect such as a fissure, from the reaction where the rail section is unimpaired; and that these differences in reaction can be exaggerated and indicated.

The passage of the flux through the rail causes eddy currents within the rail, which eddy currents are interrupted when a fissure intervenes. The variation in the eddy currents reacts like a variation in the load of the secondary of a transformer, altering the magnetic flux through the rail.

As defects in the head of the rail are much more dangerous than those occurring in any other part of the rail and as the most dangerous defects are represented by transverse fissures I have applied my invention particularly to the discovery of transverse fissures in the rail heads, although it would also discover longitudinal and diagonal fissures.

Describing first the simple diagrammatic view in Figure 1 in explanation and not in limitation:—

The rail under test is shown at 15. On opposite sides magnet poles 16, 17 and 18, 19 of laminated magnets 20 and 21 are shown, so mounted and coupled together as at 22 that they may be moved along the lengths of the rails with the inner faces of the poles in contact with the side or edge surfaces of the heads of the rails. The magnets are energized by coils 23 and 24, which are supplied with alternating or interrupted current from leads 25 and 26 connected to any suitable source 27. Both magnets are shown as supplied from the same source, in order to conveniently ensure that the current supplies for the two magnets are in phase.

In the circuits of the two magnet coils are located inductive windings 28 and 29 which are oppositely wound on the same core as in Figure 1 or oppositely connected and wound in the same direction upon the same core as in the case of coils 28', 29' of Figure 2. The coils 28 and 29 are balanced so as normally to exert identical opposite magnetic effects upon their common core. This is true also of coils 28' and 29' and all of the other corresponding pairs of coils shown in the other figures. On the same core 30 is wound a detector or exploring coil 31 which is connected with any suitable amplifier 32. The amplifier 32 is suitably connected to an indicator 33 (Figure 1) or a recorder 33' (Figure 2). Amplifiers are well known in the interpretation of radio circuits and are described in many radio books. A number are described in Ballantine on Radio Telephony for Amateurs, 2nd Edition, pages 249–260. The amplified current can be used to operate a suitable recording device such as, for example, a siphon recorder. These also are well known and I have therefore designated both diagrammatically.

The magnetic effects of the coils 28 and 29 can be balanced very exactly by matching the ampere turns of their coils and the turns and magnetic circuits of the magnet coils 23 and 24. The currents can then be adjusted for greater refinement. The electrical constants of the two circuits can be varied by the variation of resistance 34 as in Figure 3 or reactance 35 as in Figure 4 within one of the circuits. These will take care of any error in initial adjustment and also of any change in conditions due, for example, to temperature changes.

The initial balancing of the currents through the two circuits may be effected by use of a differential milli-ammeter 36 shown in Figures 3 and 4, both circuits being led into the milli-ammeter and the adjustment being varied until the indicator shows zero reading. This can be done as suggested initially without the presence of the rail and any adjustment required in use can be made to secure the normal operating condition in which there is no current through the detector or exploring coil.

The magnets are laminated in planes parallel with the magnet side faces in order to avoid eddy currents in the magnets themselves.

In the diagrammatic Figures 1 and 2 no account has been taken of variation in rail width, but the magnets differ in that Figure 1 provides for equal lengths of the magnet legs, as would be desirable where there is no structure to interfere with the movement of the magnets along the rails. With some bonding systems rail bonds upon the outsides of the rails interfere so as to make it desirable to shorten one of the magnet legs with respect to the other as seen in Figure 2.

Also in Figure 1 the coils 28 and 29 are oppositely wound, while in Figure 2 the coils 28' and 29' are wound in the same direction but oppositely connected.

There is considerable variation in the width of the rail heads and for this reason as well as to secure reasonable uniformity of contact and to avoid jamming against the rails, it is desirable to allow for differences in spacing of the magnet legs either by tapering the lower part of the magnets as at 37 in Figure 3 or by relatively moving one or both of the magnet legs with respect to the magnet yoke as seen in Figure 5.

In this last figure one leg terminates in a cylindrical boss or bead 38 which is pivoted at the center of the cylinder in straps 39 secured to the yoke, so that the leg may swing to a slight extent and still maintain substantially the same magnetic conditions at the joint Fluctuation in the magnetic flux through the joint is further avoided by the use of a flexible strap 40 of permeable material, laminated, which carries the greater part of the flux. The leg is resiliently drawn inwardly by spring 41 so as to constantly press the leg against one side of the rail head. This figure showing a pivoted leg movement is designed to be a suggestion merely, intended as diagrammatic disclosure of any form of mounting by which movement of one leg with respect to the yoke may be secured.

Where an odd size of rail is to be tested it is better to use a different set of magnets suited to the rail rather than to attempt to fit it by a wide adjustment of the magnet legs.

In operation, as the pair of magnets is advanced along the rail their magnetic circuits are closed by flux across the rail head. The two paths of flux will be equal where the rail conditions met by them are equal and, as is well known in the electrical art, eddy currents will flow in the rail in planes transverse to the flux. The path of the flux, where a magnet like that shown in Figure 2 is used, is shown in Figure 9. The path of the eddy currents is shown in Figure 10.

These transverse planes will be parallel to the lengths of the rail, with the result that the eddy currents cannot flow where the continuity of the rail section is interrupted, as by fissures or other defects in the rail.

The two magnets and their circuits may be compared to transformers and in fact are transformers in which the eddy currents are the secondaries and in which coils 23, 24 are the primaries. With equal rail conditions the magnetic circuits of these two transformers are the same and no variation will take place in the currents passing through coils 28 and 29, or 28' and 29'. However, when a fissure or other rail defect interferes with or stops the flow of eddy currents in either transformer the effect is to place the "secondary" of the transformer on low load or to open the "secondary" circuit, according to the completeness of the interruption. This reacts upon the primary of the transformer through the magnetic flux, changing the primary current and upsetting the equality of current through the balanced coils 28 and 29, or 28' and 29'. This generates current in the detector or exploring coil 31. With movement of the magnets in the direction of the arrows in Figures 1 and 2, magnet 20 should be affected first. The disturbance should reduce in amount as magnet 20 passes the point and then increase again as magnet 21 approaches the same point, giving a double reading for each imperfection.

Though the theory as thus far discussed indicates effect upon the indicator from transverse fissures only it is evident that longitudinal fissures also would affect the indicator, for the reason that longitudinal fissures would interrupt the magnetic flux. Similarly any serious disturbance of the crystalline structure of the rail would affect the indicator, though to a lesser degree. Such a disturbance might be caused by granulation.

The voltage of the circuit may be varied according to the quantitative value of the currents sought to be set up, the part of the magnetic curve at which it is desired to "work" the magnet cores and the magnetic and electrical properties of the rails being tested.

The frequency used will affect the path of the eddy currents and may be selected with this thought in mind. If it be desired to improve the thoroughness or range of exploration of the rail section, a plurality of frequencies may be used through the same or different coils. High frequencies and low frequencies act differently and give different eddy current distributions because of the greater skin effect with high frequency than with low frequency and the greater tendency of high frequency current than of low frequency to select its path so as to improve the coupling. The diagrammatic illustration in Figure 3 is not intended to be a complete disclosure of the various ways in which the two frequencies can be applied, but merely to indicate one way by which, without the necessity for separate coils, two sources of current of different frequencies 27 and 27' can be used. I show frequency screens or filters 42 and 42' to prevent leakage of either current back through the other source.

It is highly desirable to maintain the magnetic flux through the rail at a value at which it shall be sensitive to changes in the magneto-motive force and for this reason to keep the magnetic flux well below the saturation point of the steel of which the rail is composed. As the magnetizing curve for steel is very steep during a portion of its length there is a wide range of magnetization of the steel which will serve the purpose. This permits the selection of relatively low flux with small eddy currents or relatively large flux with correspondingly large eddy currents or any range between these. Either may prove desirable according to the character of the other conditions met in the test.

Where higher frequency alone is used it is desirable that the detector transformer be an air transformer rather than a core transformer and for this reason I have shown such a transformer in Figure 2a in which coils $28^2$, $29^2$ and $31'$ are concentric but without a core.

In order to indicate that any type of transformer and any type of transformer winding may be used I have applied the coils of Figure 1 respectively to two different shell type transformers in Figures 7 and 8, in both of which the coils are concentric as they are intended to be in Figures 1—4 and 2a. In Figure 2a a coreless transformer is shown, such as would be used with high frequency.

In Figure 7 the two coils $28^3$ and $29^3$ are distributed on opposite sides of the detector coil $31^2$, whereas in Figure 8 the coils are wound one on top of another, the detector coil being shown on the outside.

It is desirable to make some provision against injury to the magnet faces which adjoin the rail and for this reason I show in Figure 3 a guard 43 which is mounted to move in advance of the magnets and which will be stopped by any irregularity of surface which would interfere with proper passage of the magnets; such irregularity, for example, as would be caused by a burr or wicker. The guard is resiliently supported by springs 44.

It will be evident that any reduction in magnetic flux through the rail head will be magnified by the amplifier and that the amplified indication will be recorded.

This will occur whether the reduction of flux be caused directly by interruption of the paths of the lines of flux (due to a fissure or other defect extending longitudinally of the rail); or to be caused indirectly by "opening" or reduction of load in the eddy current "secondary" path (from a transverse fissure or defect) reacting indirectly upon the lines of flux as in a transformer; or because of a combination of these by reason of a diagonal fissure or other defect.

It will further be evident that in its broader aspects my invention is wholly free from the details of the magnets, coils, etc., provided the current through what I have called the balanced coils, be properly balanced to give current in the detector coil where there is a variation in the magnetic flux through the rail.

It will be evident that any system of alteration of the width of magnet contacts by movement of one of the legs or by tapering the magnets to apply different portions of the magnetic faces where the width is different, must not introduce an alteration of the magnetic flux of the same order of magnitude as the alteration of magnetic flux caused by the defects sought to be indicated in the rails.

It will be evident that the presence of the detector current may be determined by either an indicating or a recording instrument.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. The method of testing for defects in long sections of magnetically permeable material, which consists in electromagnetically causing fluxes to pass in parallel paths om side to side across through the material to be tested, in progressing the flux paths longitudinally of the material, in utilizing inductances in the circuit paths of the magnets by which the fluxes are produced, in balancing the inductances in opposition to each other, in causing induction of electric current by difference in magnetic effects of the current through the inductances and in using the electric current so produced as evidence of a defect at the point in question.

2. The method of detecting defects in a railroad rail, which consists in providing spaced electromagnets having their poles on opposite sides of the rail head, in maintaining the poles in relation with the rail head notwithstanding variation in the width of the head, in inducing magnetic flux by the magnets, in advancing the magnets while maintaining their spacing along the length of the rail, in balancing and opposing the magnetic effects of the currents for the magnets at a point at which the currents are free from inductive coupling with the rail and in inducing detector current by relative alteration in the opposed magnetic effects.

3. In a device for electromagnetically testing metallic objects for defects, a pair of spaced electromagnets having coils and being free to move transversely and to direct flux across the object at spaced points, circuits for said coils having the currents in the circuits in phase, inductances in the circuits free from inductive coupling with the object to be tested and normally balanced in position opposed to each other, and a detector coil in inductive relation with both inductances and in position to receive induction from one of the inductances when they are unbalanced.

4. In a device for electromagnetically testing metallic objects for defects, a pair of electromagnets having poles adapted to engage an object to be tested and to transmit flux transversely from one side to the other through the object in planes parallel for the two magnets, and having windings for the two magnets, current supply for the windings in phase, the one with the other, inductor coils, one in series with each winding, equal in ampere turns and opposed, one to the other, a detector inductor coil in inductive relation with the opposed balanced coils, an amplifier connected with the detector coil and means for determining the presence of the amplified current.

5. In a device for electromagnetically testing rails for defects, a pair of U electromagnets having coils and having poles adapted to bridge a rail head from side to side and free to move in a direction transverse to the flux across the U, circuits for said coils having the currents in the circuits in phase, inductances free from inductive coupling with the rail in the circuits normally balanced in position opposed to each other, and a detector coil in position to receive induction from the inductances when they are unbalanced.

6. A pair of electromagnets having poles adapted to engage metal to be tested and to transmit flux through the metal in planes parallel for the two magnets, windings for the two magnets, current supply for the windings in phase, the one with the other, circuits for the two magnets, inductor coils free from inductive coupling with the metal to be tested, one in each circuit, equal in ampere turns and opposed one to the other, a detector inductor coil in inductive relation with the opposed balanced coils and an amplifier connected with the detector coil.

7. A pair of electromagnets having poles adapted to bridge the head of a rail and to pass flux across through the head of the rail, spaced and adapted to be moved transversely to the electromagnetic fluxes, inductances inserted respectively in circuit with the coils of the two electromagnets, the inductances being opposed and balanced, sources of current supply of different frequency, each supplying both circuits, phase screens protecting the sources of supply against the leakage of current, each from the other, and an inductor coil in inductive relation to the inductances.

8. In a U-shaped electromagnet having a yoke and two legs, a pivoted leg portion having its surface adjoining the pivot formed as a cylinder about the pivot as the axis, a support therefor holding the cylinder against the remainder of the magnet, and a spring pulling the pivoted leg toward the other leg.

9. In a U-shaped electromagnet having a yoke and two legs, a pivoted leg portion having its surface adjoining the pivot formed as a cylinder about the pivot as the axis, a support therefor holding the cylinder against the remainder of the magnet, a spring pulling the pivoted leg portion toward the other leg portion, and a flexible magnetically permeable strap constantly engaging the yoke and leg.

10. In a detector for faults in railroad rails, a pair of spaced electromagnets adapted to be moved lengthwise of the rails, and engaging opposite faces of the rails on the two sides of each electromagnet and a guard maintained in position ahead of the electromagnets to stop the electromagnets where the head of the rail is deformed.

11. In a detector for faults in railroad rails, a pair of spaced electromagnets adapted to be moved lengthwise of the rails, and engaging opposite faces of the rails on the two sides of each electromagnet and a resiliently mounted guard maintained in position ahead of the electromagnets to stop the electromagnets where the head of the rail is deformed.

12. The method of testing for defects in a rail, which consists in electromagnetically producing spaced paths of flux from side to side generally transverse of the rail head by inducing currents, whereby eddy currents are set up in the rail in planes transverse to the flux, in advancing the paths longitudinally relative to the rail, in leading the inducing currents to a point at which they are free from inductive coupling with the rail and there balancing and opposing the inducing currents, whereby change of the eddy currents due to a defect will upset the balance of the inducing currents, in inducing detector current when the inducing currents are unbalanced and in determining the presence of the detector current.

13. The method of testing for defects in a rail, which consists in electromagnetically producing spaced paths of fluctuating magnetic flux from side to side generally transverse of the rail head by inducing currents, whereby eddy currents are set up in the rail in planes transverse to the flux, in advancing the paths longitudinally relative to the rail, in leading the inducing currents to a point at which they are free from inductive coupling with the rail and there balancing and opposing the inducing currents, whereby change of the eddy currents due to a defect will upset the balance of the inducing currents, in inducing detector current when the inducing currents are unbalanced, in amplifying the detector current and in determining the presence of the amplified detector current.

14. The method of ascertaining the presence of defects in a metallic object, which consists in inducing magnetic flux transversely of the object at spaced points by inducing currents, in progressively advancing the points of inductive application with respect to the object, in balancing the inducing currents under normal conditions, in setting up an induced detector current under unbalanced conditions, the induced detector current being free from inductive coupling with the object, and in determining the presence of the induced detector current.

15. The method of testing for defects in a metallic object, which consists in electromagnetically passing flux in parallel paths transversely of the object by inducing currents, in progressing the paths transversely to their lengths, in balancing and opposing the electromagnetic effects of the inducing currents free from inductive coupling with the object at the point of opposition, in setting up an induced detector current when the inducing currents are unbalanced and in determining the presence of the induced detector current.

16. In a rail tester, spaced U-shaped electromagnets having magnet coils and having poles spanning successively the same portion of the head of a rail, and passing flux transversely of the rail head, means for securing the electromagnets in spaced relation, a source of alternating current, connections from the source to each magnet coil placing the magnet coils in parallel branches, a transformer coil in each parallel branch in series with each magnet coil, the transformer coils being inductively opposed, a detector coil in inductive relation with both transformer coils and means for determining the presence of current in the detector coil.

17. In a rail tester, spaced U-shaped electromagnets having magnet coils and having poles spanning successively the same portion as the head of a rail, and passing flux transversely of the rail head, means for securing the electromagnets in spaced relation, a source of alternating current, connections from the source to each magnet coil placing the magnet coils in parallel branches, a transformer coil in each parallel branch in series with each magnet coil, the transformer coils being inductively opposed, a detector coil in inductive relation with both transformer coils, an amplifier connected to the detector coil and means for determining the presence of the amplified detector coil current.

18. In a rail tester, spaced U-shaped electromagnets having magnet coils and having poles spanning successively the same portion of the head of a rail, and passing flux transversely of the rail head, means for securing the electromagnets in spaced relation, a source of alternating current, connections from the source to each magnet coil placing the magnet coils in parallel branches, a transformer coil in each parallel branch in series with each magnet coil, the transformer coils being inductively opposed, means for adjusting the impedance of one parallel branch with respect to the other to balance the transformer coils, a detector coil in inductive relation with both transformer coils and means for determining the presence of current in the detector coil.

19. In a rail tester, spaced U-shaped electromagnets having magnet coils and having poles spanning successively the same portion of the head of a rail, and passing flux transversely of the rail head, means for securing the electromagnets in spaced relation, a source of alternating current, connections from the source to each magnet coil placing the magnet coils in parallel branches, a transformer coil in each parallel branch in series with each magnet coil, the transformer coils being inductively opposed, means for adjusting the impedance of one parallel branch with respect to the other to balance the transformer coils, a detector coil in inductive relation with both transformer coils, an amplifier connected to the detector coil and means for determining the presence of the amplified detector coil current.

20. In a device for determining defects in rails, a pair of spaced electromagnets having poles spanning the head of a rail and passing flux from side to side across through the head of the rail, adapted to be moved transversely to the electromagnetic fluxes, inductances inserted respectively in circuit with the coils of the two electromagnets, the inductances being opposed and balanced, a source of high frequency current for said inductances and magnet windings and a coil magnetically coupled with said inductances to receive current by induction when they vary in their electromagnetic effects.

21. In a device for determining defects in rails, a pair of spaced electromagnets having poles spanning the head of a rail and passing flux from side to side across through the head of the rail, adapted to be moved transversely to the electromagnetic fluxes, inductances inserted respectively in circuit with the coils of the two electromagnets, the inductances being opposed and balanced, a high frequency source of current supplying both circuits, and an inductor coil in inductive relation to the inductances.

ARTHUR E. F. BILLSTEIN.